(12) United States Patent
Karimelahi et al.

(10) Patent No.: US 10,274,681 B1
(45) Date of Patent: Apr. 30, 2019

(54) OPTICAL EQUALIZER FOR PHOTONICS SYSTEM

(71) Applicant: INPHI CORPORATION, Santa Clara, CA (US)

(72) Inventors: Samira Karimelahi, Santa Clara, CA (US); Masaki Kato, Palo Alto, CA (US)

(73) Assignee: INPHI CORPORATION, Santa Clara, CA (US)

(*) Notice: Subject to any disclaimer, the term of this patent is extended or adjusted under 35 U.S.C. 154(b) by 0 days.

(21) Appl. No.: 15/853,422

(22) Filed: Dec. 22, 2017

(51) Int. Cl.
| | |
|---|---|
| *G02B 6/293* | (2006.01) |
| *H04B 10/25* | (2013.01) |
| *G02B 6/28* | (2006.01) |
| *H04L 25/03* | (2006.01) |

(52) U.S. Cl.
CPC ....... *G02B 6/29391* (2013.01); *G02B 6/2856* (2013.01); *G02B 6/29344* (2013.01); *G02B 6/29352* (2013.01); *H04B 10/25* (2013.01); *H04L 25/03885* (2013.01)

(58) Field of Classification Search
None
See application file for complete search history.

(56) References Cited

U.S. PATENT DOCUMENTS

| | | | |
|---|---|---|---|
| 6,344,914 B1* | 2/2002 | Shimojoh | H01S 3/10023 398/17 |
| 6,807,376 B2* | 10/2004 | Shimojoh | H01S 3/10023 398/149 |

\* cited by examiner

*Primary Examiner* — Sung H Pak
(74) *Attorney, Agent, or Firm* — Richard T. Ogawa; Ogawa P.C.

(57) ABSTRACT

The present disclosure provides an optical equalizer for photonics system in an electric-optical communication network. The optical equalizer includes an input port and an output port. Additionally, the optical equalizer includes a filter having a number of stages coupled to each other in a multi-stage series with an output terminal of any stage being coupled to an input terminal of an adjacent next stage while the input terminal of a first stage of the multi-stage series being coupled from the input port. Each stage includes a tap terminal configured to pass an optical power factored by a coefficient of multiplication from the corresponding input terminal of the stage to a tap-output path characterized by a corresponding phase delay. Furthermore, the optical equalizer includes a combiner configured to sum up the optical powers respectively from the number of tap-output paths of the multi-stage series to the output port.

21 Claims, 5 Drawing Sheets

OPTICAL EQUALIZER FOR PHOTONICS SYSTEM

CROSS-REFERENCE TO RELATED APPLICATIONS

N/A

BACKGROUND OF THE INVENTION

The present invention relates to optical communication techniques. More particularly, the present invention provides an optical equalizer, a photonics system having the same, and a method of using thereof.

Equalizers are required to overcome the inter-symbol interference (ISI) generated by bandwidth limitations of electro-optical components for optical communication such as modulator or other impairments due to optical fiber such as chromatic dispersion and polarization mode dispersion.

Equalization in optical domain is advantageous over electrical domain as phase information is available in the optical domain. A few types of optical equalizers have been proposed based on optical finite impulse response (FIR) filters before, where some are limited to specific source of ISI in the transmitted signals and some need to be used at the receiver as the summation is done in electrical domain. Some other ones suffer poor performance due to thermal variation. Improved optical equalizer is desired and important for new generation photonics system used in electro-optical communication network.

BRIEF SUMMARY OF THE INVENTION

The present invention relates to optical telecommunication techniques. More particularly, the present invention provides an optical equalizer based on finite impulse response (FIR) filters in some unique configurations for overcoming different sources of ISI with many benefits in saving power and easing the design procedure, being temperature independent, decreasing propagation loss, and saving device area integrated in photonics system, though other applications are possible.

In an embodiment, the present invention provides an optical equalizer. The optical equalizer includes an input port and an output port. Additionally, the optical equalizer includes a filter having a number of stages coupled to each other in a multi-stage series with an output terminal of any stage being coupled to an input terminal of an adjacent next stage while the input terminal of a first stage of the multi-stage series being coupled from the input port configured to receive an optical signal. Each stage includes a tap terminal configured to pass a fraction of the optical signal factored by a coefficient of multiplication to a tap-output path of the corresponding stage characterized by a corresponding phase delay. Furthermore, the optical equalizer includes a combiner configured to sum up respective fractions of the optical signal from the number of tap-output paths of the multi-stage series to the output port.

In an alternative embodiment, the present invention provides a photonics system used in electro-optical communication network comprising an optical equalizer per optical channel before a receiver or at the transmitter. The optical equalizer includes an input port, an output port, and a filter having a number of stages coupled to each other in a multi-stage series with an output terminal of any stage being coupled to an input terminal of an adjacent next stage while the input terminal of a first stage of the multi-stage series being coupled from the input port configured to receive an optical signal from the optical channel. Each stage includes a tap terminal configured to pass a fraction of the optical signal factored by a coefficient of multiplication to a tap-output path of the corresponding stage characterized by a corresponding phase delay. The optical equalizer further includes a combiner configured to sum up respective fractions of optical signal from the number of tap-output paths of the multi-stage series to the output port.

The present invention achieves these benefits and others in the context of known waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
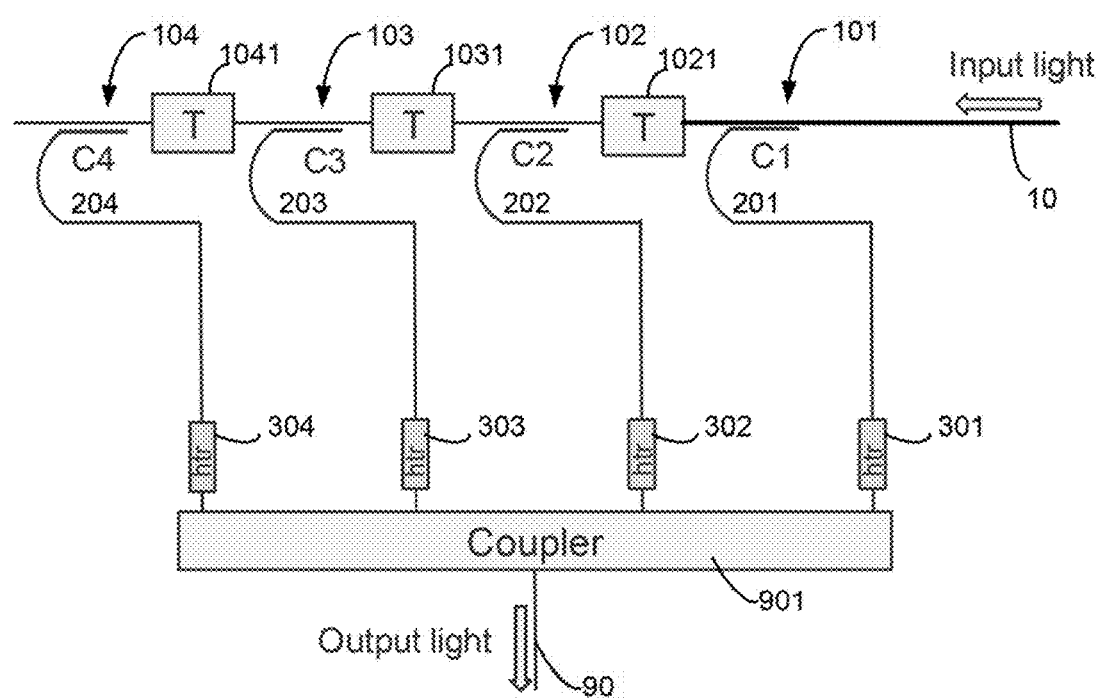
FIG. 1 is a schematic diagram of an optical equalizer based on FIR filter in a multi-stage series according to some embodiments of the present disclosure.

The present invention relates to optical telecommunication techniques. More particularly, the present invention provides an optical equalizer based on finite impulse response (FIR) filters in some unique configurations for overcoming different sources of ISI with many benefits in saving power and easing the design procedure, being temperature independent, decreasing propagation loss, and saving device area integrated in photonics system, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, entry, exit, clockwise and counter clockwise have been used for convenience purposes only and are not intended to imply any particular fixed direction. Instead, they are used to reflect relative locations and/or directions between various portions of an object.

In general, finite impulse response (FIR) filters include multiple signal handling features such as providing a phase delay, adjusting amplitude by one or more coefficient of multiplication, and summing up multiple sub-signals. Conventionally, these are typically implemented in electrical domain or not even doable as phase information is only available in optical domain. In some embodiments of the present disclosure, these features are realized all in optical domain. The delay line of each optical FIR filter is implemented by passive waveguide integrated with a thermal tuner. The coefficients of multiplication of the optical FIR filters and summation in optical domain are implemented by any types of couplers such as directional coupler, multimode interference (MMI) coupler, or tunable coupler based on Mach-Zehnder Interferometer (MZI).

Accordingly, the present disclosure provides, inter alia, an optical equalizer based on optical FIR filters, and a photonics system having the optical equalizer per optical channel that substantially obviate one or more of the problems due to limitations and disadvantages of the related art.

In one aspect, the present disclosure provides an optical equalizer for overcoming the inter-symbol interference (ISI) generated by bandwidth limitations of electro-optical components in a communication network. FIG. 1 is a schematic diagram of an optical equalizer based on FIR filter in a multi-stage series according to some embodiments of the present disclosure. This diagram is merely an example, which should not unduly limit the scope of the claims. One of ordinary skill in the art would recognize many variations, alternatives, and modifications. Referring to FIG. 1, the optical equalizer includes a filter having a number of stages coupled to each other in a multi-stage series with an output terminal of any stage (e.g., stage 102) being coupled to an input terminal of an adjacent next stage (i.e., stage 103) while the input terminal of a first stage 101 of the multi-stage series being coupled from an input port 10 configured to receive an optical signal. Each stage includes a tap coupler, denoted as 101, 102, . . . . Each tap coupler per stage includes a tap terminal configured to pass a fraction of the optical signal factored by a coefficient of multiplication (e.g., C1) to a tap-output path (e.g., path 201) of the corresponding stage (101). Each phase delay per stage (except the first stage 101) is represented by a time-delay relative to a previous stage thereof as marked by T. For example, Stage 102 has a time-delay 1021. Stage 103 has a time-delay 1031. Stage 104 has a time-delay 1041. Additionally, the optical equalizer includes a combiner 901 configured to sum up respective fractions of the optical signal from the number of tap-output paths (e.g., 201 through 204) of the multi-stage series to an output port 90. Optionally, the combiner 901 is a MMI or multiple directional couplers.

Optionally, the tap coupler per stage is a directional coupler. Optionally, the directional coupler is an asymmetric coupler with the output and tap-output path for respective outputting uneven optical power. Optionally, the coefficient of multiplication (e.g., C1 or C2, . . . ) of a particular stage of the multi-stage series is dependent upon the tap weight of the current stage and as well as other tap ratios of previous stages. For example, the first coefficient of multiplication C1 of the first stage is simply the same as the tap weight w1 of the first stage 101 for outputting power to the first tap-output path 201. Both the first coefficient of multiplication C1 of the first stage and the second coefficient of multiplication C2 of the second stage are available for tuning to achieve a desired tap weight w2=(1−C1)C2 for outputted power to the second tap-output path 202 of the second stage. Similarly, the tap weight w3 of the third tap-output path 203 of the third stage can be expressed as w3=(1−C1)(1−C2)C3. Each coefficient of multiplication provides direct adjustment to amplitude of the input optical signal at the tap-output path of corresponding stage. In the low-power equalization scenario, a coefficient of multiplication is predetermined for a directional coupler at a certain stage and the optical equalizer is made to be non-adaptive. This is useful to save power when the source ISI is predictable. For symmetric ISI, the optical equalizer configured as FIG. 1 can be simplified as one 3 dB coupler which can set amplitudes of two same-order pre- and post-cursors of the optical signal to achieve equalization.

Optionally, asymmetric MMI coupler or other form of couplers can also be used to replace the directional coupler or tap coupler. The number of stages of the multi-stage series can be increased by increasing the number of taps therein to improve the ISI cancelation. As seen above, the coefficient of multiplication at higher stage becomes smaller. Therefore, the trade-off between power consumption and number of taps used should be taken into account to determine an optimized configuration of the optical equalizer.

Optionally, each tap-output path (e.g., 201) is made of a passive waveguide characterized by a planar material, a length, and a width, which can be selected to be a delay line for tuning phase delay among the different tap-output paths.

Referring to FIG. 1, the optical equalizer includes a thermal heater (e.g., 301 through 304) per tap-output path (e.g., 201 through 204), which is used adjust the phase for each tap based on tuning of refraction index of the planar material by changing the temperature locally. With phase tuning capability provided by the thermal heater at each stage, the optical equalizer is built based on multi-purpose complex FIR filter. Depending on application, the phase of the FIR filter can be linear or non-linear.

Figure 2:
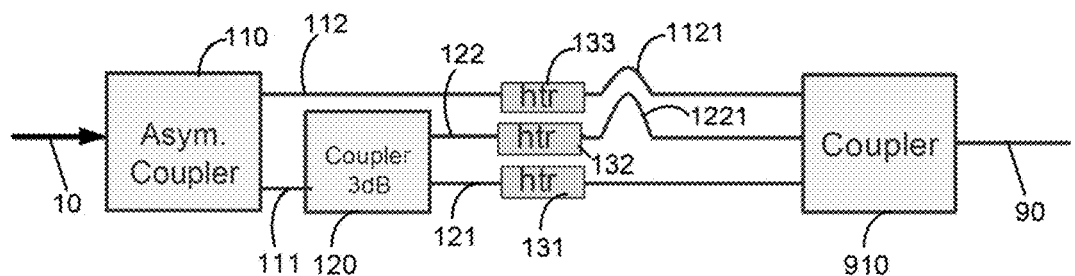
FIG. 2 is a schematic diagram of an optical equalizer for low power application to overcome symmetric inter-symbol interference (ISI) according to an embodiment of the present disclosure.

FIG. 2 is a schematic diagram of an optical equalizer for low power application to overcome symmetric ISI according to an embodiment of the present disclosure. Referring to FIG. 2, in the embodiment, the optical equalizer is a two-stage FIR filter with an asymmetric coupler 110 being disposed at the first stage to receive an input optical signal having an input optical power from the input port 10. The asymmetric coupler optionally is a directional tap coupler having a first output path 112 as a main-output path and a second output path 111 as a tap-output path with an asymmetric tap ratio for outputting corresponding fraction of optical power. For example, the first output path 112 outputs 80% of the input optical power and the second output path 111 outputs 20% of the input optical power. A 3 dB coupler 120 is disposed to the second stage including a first output path 121 and a second output path 122. In principle, the two output paths 121 and 122 are associated with a same coefficient of multiplication, leading to three different coefficients of multiplication, 80%, 10%, and 10% respectively for corresponding amplitude adjustment and two paths for handling symmetric ISI.

Referring to FIG. 2, each output path, 112, 121, or 122 can be configured as a passive waveguide with different phase delays. For example, each path can include a thermal heater, 133, 131, or 132, for tuning the phase thereof. Optionally, the waveguide can be made with different length to provide extra phase delay via different time delay for fraction of optical signal to travel through thereof. For example, the output path 112 is introduced with an extra length 1121 and the output path 122 is introduced with an extra length 1221. The optical equalizer shown in the example of FIG. 2 further includes a 3×1 combiner 910 to combine the three output paths to sum up the optical powers and output to the output port 90. Optionally, the combiner 910 is an MMI coupler or a combination of multiple directional couplers.

Figure 3:
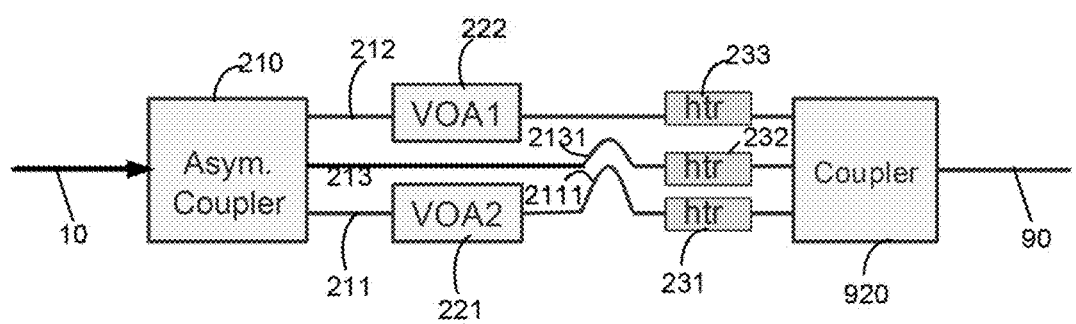
FIG. 3 is a schematic diagram of an optical equalizer having adaptive amplitude and phase by incorporating an asymmetric coupler with variable optical attenuators (VOA) and thermal heaters according to some embodiments of the present disclosure.

The optical equalizer provided in this disclosure can be made adaptive, i.e., to have adaptive coefficients of multiplication and tunable phase. FIG. 3 is a schematic diagram of an optical equalizer having adaptive amplitude and phase by incorporating an asymmetric coupler with variable optical attenuators (VOA) and thermal heaters according to some embodiments of the present disclosure. Referring to FIG. 3, the optical equalizer includes an asymmetric coupler 210 coupled to the input port 10 to receive an optical signal with an input optical power. Optionally, the asymmetric coupler 210 is a device or 1-by-3 coupler with a first output path 211, a second output path 213, and a third output path 212 for respectively outputting an asymmetric fraction of optical power thereof. In the embodiment, the optical equalizer includes a VOA2 disposed in the first output path 211 and a VOA1 disposed in the third output path 212. Each of the VOA1 and VOA2 is able to independently adjust the amplitude of a fraction of the optical signal in the corresponding output path based on carrier injection. In the embodiment, additionally, the optical equalizer can also include thermal heaters 231, 232, and 233 respectively disposed in the output paths 211, 213, and 212 to independently adjust phase thereof. Other phase delays may be introduced in association with providing different extra length, e.g., 2111 in the output path 211 and 2131 in the output path 213, in terms of providing different time delay. Other phase delays can be introduced by changing material type for the passive waveguide on a selected output path or changing width of the passive waveguide or changing polarization mode for the fraction of optical signal passing through the corresponding output path. Finally, the optical equalizer includes a combiner 920 configured to combine the three output paths to sum up all corresponding fractions of optical power with different phase delays to output an output signal to the output port 90 with desired optical power and phase. Optionally, the combiner 920 is an MMI coupler or a combination of multiple directional couplers.

Figure 4:
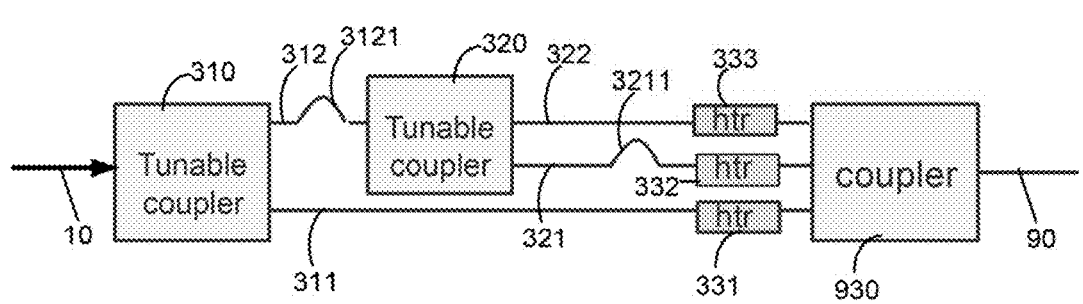
FIG. 4 is a schematic diagram of an optical equalizer having adaptive amplitude and phase by incorporating multiple tunable couplers and thermal heaters according to some embodiments of the present disclosure.

In an alternative embodiment, the coefficient of multiplication or power ratio tuning in the optical equalizer based on the optical FIR filter can be done by inserting one or more tunable couplers into respective one or more stages. FIG. 4 is a schematic diagram of an optical equalizer having adaptive amplitude and power ratio tuned by incorporating multiple tunable couplers and having adaptive phase tuned by thermal tuners according to some embodiments of the present disclosure. Referring to FIG. 4, the optical equalizer includes a first tunable coupler 310 disposed in the first stage and a second tunable coupler 320 disposed in the second stage. The first tunable coupler 310 is configured to receive an input optical signal from the input port 10 and has two output arms, 311 and 312, for respectively outputting two fractions of the input optical signal. The tunable coupler 310 is configured to tune the power ratio between the two output arms 311 and 312. Optionally, the second output arm 312 is included with an extra phase delay 3121 for a second fraction of the input optical signal relative to a first fraction of the input optical signal through the first output arm 311. In the embodiment, the second tunable coupler 320 is disposed in the second output arm 312 to generate another two fractions of the second fraction of the input optical signal to two other output arms 321 and 322. The tunable coupler 320 is configured to tune the power ratio between two other output arms 321 and 322. Optionally, the first one 321 of the two other output arms is introduced with an extra phase delay 3211 relative to the second one 322 of the two other output arms. Additionally, three thermal heaters 331, 332, and 333 are respectively disposed in the first output arm 311 of the first stage, the output arm 321 and the other output arm 322 of the second stage. Finally, the optical equalizer includes a combiner 930 configured to combine the three output arms to sum up all corresponding fractions of optical power with different phase delays to generate an output signal to the output port 90 with desired optical power and phase. Optionally, the combiner 930 is an MMI coupler or a combination of multiple directional couplers.

Figure 5:
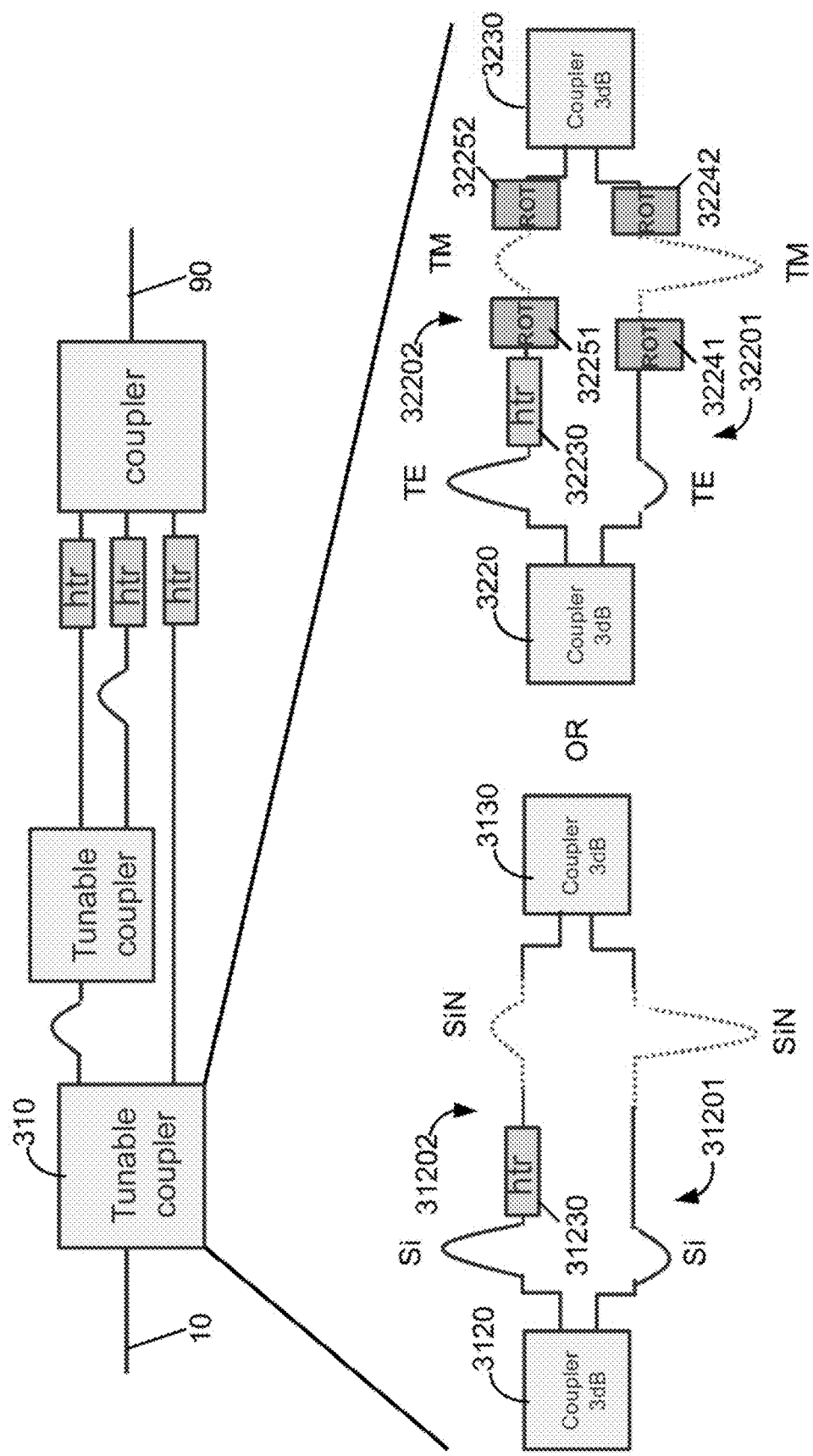
FIG. 5 is a schematic diagram of an A-thermal optical equalizer having a tunable filter based on Mach-Zehnder interferometer (MZI) according to two embodiments of the present disclosure.

In a specific embodiment, the tunable coupler is based on Mach-Zehnder Interferometer (MZI). FIG. 5 is a schematic diagram of a tunable coupler based on Mach-Zehnder interferometer (MZI) in the optical equalizer of FIG. 4 according to two embodiments of the present disclosure. Referring the FIG. 5, two examples of the tunable filter based on MZI are shown for the first tunable coupler 310. Of course, these examples are also applicable to the second tunable coupler 320. In a first example, the tunable coupler is configured with a first optical arm 31201 and a second optical arm 31202 both connected between a first 3 dB coupler 3120 and a second 3 dB coupler 3130. Optionally, each of the two 3 dB couplers can be an MMI coupler. Optionally, each of the two optical arms can be made by a same material or made by a combination of at least two different materials with respect lengths to introduce a phase delay between the two output arms and at least one optical arm includes a thermal heater 31230 to tune the phase delay by changing refraction indices of the materials locally in the at least one optical arm.

In a second example, the tunable filter is configured with a first optical arm 32201 and a second optical arm 32202 both connected between a first 3 dB coupler 3220 and a second 3 dB coupler 3230. Again, the 3 dB coupler may an MMI coupler. Optionally, at least one of the optical arms includes a pair of polarization rotators to make the polarization mode in one optical arm to be different from another optical arm. In the example, the first optical arm 32201 is configured to transmit a transverse electric (TE) mode optical signal. The first optical arm 32201 includes a first polarization rotator 32241 and a second polarization rotator 32242 respectively disposed in two ends of a portion of the first optical arm 32201. Optionally, within the portion between the first polarization rotator 32241 and a second polarization rotator 32242, the TE mode optical signal is rotated to a transverse magnetic (TM) mode optical signal. By changing the polarization mode the optical signal travels through a same material of the optical arm, the group index is changed yielding different time delay or phase delay. In the example, the second optical arm 32202 includes a first polarization rotator 32251 and a second polarization rotator 32252 respectively disposed in two ends of a portion of the second optical arm 32202. Similarly, within the portion between the first polarization rotator 32251 and a second polarization rotator 32252, the TE mode optical signal is changed to the TM mode optical signal. By setting different length (or width) of the portion between two polarization rotator, different phase delay between the two optical arms can be obtained. Again, like a typical MZI-based tunable filter at least one optical arm, 32202, includes a thermal heater 32230 to tune the phase delay of the at least one optical arm.

In either of the two examples, the tunable coupler can make amplitude or power adjustment to any one of its two output arms, which is accordingly used as an output path of one stage of the optical equalizer based on the optical FIR filter in the multi-stage series configuration.

In an embodiment, the tunable coupler based on MZI can be made itself temperature independent, i.e., a-thermal, by using a combination of materials and/or polarization modes in the two optical arms of MZI. As shown in the first example of FIG. 5, the combination of silicon nitride (SiN) and silicon (Si) materials are implemented in the two optical arms of the MZI (i.e., the tunable coupler 310 itself) with the optical signal in each arm being set to a same TE polarization mode. The tunable filter 310 based on the MZI can be made a-thermal by setting the following condition:

$$\frac{dn_{SiN}}{dT}\Delta L_{SiN} = \frac{dn_{Si}}{dT}\Delta L_{Si},$$

where the refractive indices variation of SiN and Si materials over temperature are given as $$\frac{dn_{SiN}}{dT} \sim 4e^{-5}, \frac{dn_{Si}}{dT} \sim 1.8e^{-4},$$

and $\Delta L_{SiN}$ is the length difference of SiN material between the two arms and $\Delta L_{Si}$ is the length difference of Si material between the two arms.

Alternatively in the second example shown in FIG. 5, the combination of two polarization modes are implemented in the two optical arms of the tunable coupler based on the MZI with each arm being made by Si material. The tunable filter 310 based on the MZI can be made to be a-thermal by setting the following condition:

$$\frac{dn_{TM}}{dT}\Delta L_{TM} = \frac{dn_{TE}}{dT}\Delta L_{TE},$$

where the group indices variation of the TE mode and TM mode over temperature for the two optical arms in Si material are given as $$\frac{dn_{TE}}{dT} \sim 1.8e^{-4}, \frac{dn_{TM}}{dT} \sim 3.6e^{-4},$$

and $\Delta L_{TE}$ is the length difference of the portion of the arm set for passing TE mode optical signal between the two arms and $\Delta L_{TM}$ is the length difference of the portion of the arm set for passing TM mode optical signal between the two arms.

In some embodiments, the optical equalizer based on optical FIR filter disclosed in this application is capable of being fully integrated onto a silicon substrate. For example, each stage of the optical equalizer of FIG. 1 is made by a coupler in planar waveguide form. For example, MMI coupler is used for each filter. For example, a tunable filter based on MZI is used for each filter. Additionally, each tap-output path of each stage is configured to be a passive waveguide to provide delay in phase. Unlike the conventional passive waveguide to be made usually long, several techniques are introduced in the present disclosure for shortening the delay lines of these passive waveguide so that a more compact optical equalizer can be integrated on the silicon substrate. As the group velocity of an optical signal increases for wider width waveguides, the wider width waveguide can be selected to be a fast line in order to decrease the delay line length of the narrower width waveguide. In principle, the time delay T between the slow line and the fast line can be shown as:

$$\frac{L_{wg}}{v_g} - \frac{L_{wgW}}{v_{gW}} = T$$

where $L_{wg}$ and $L_{wgW}$ are the lengths of the waveguide in the slow line and the fast line, respectively. $v_g$ and $v_{gW}$ are the group velocities of the optical signal travelling through the normal width waveguide and the wider width waveguide, respectively.

Figure 6A:
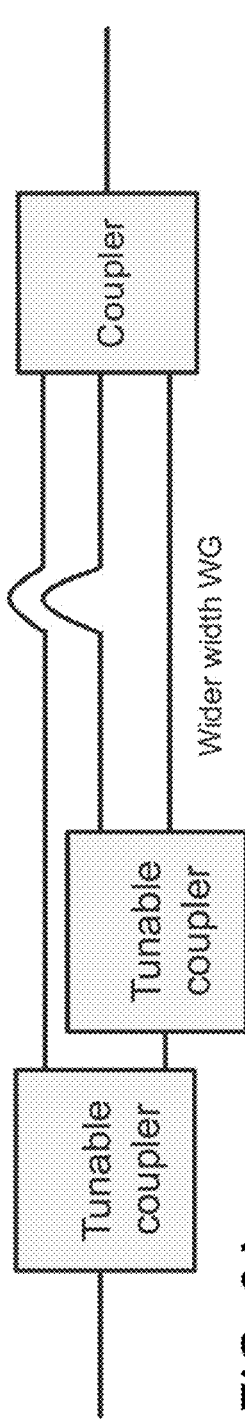
FIGS. 6A, 6B, and 6C are schematic diagrams of an optical equalizer with shorter delay lines via one of multiple techniques according to some embodiments of the present disclosure.

In an embodiment, as shown in FIG. 6A, each of these passive waveguides is characterized by a planar material, a length, and a width yielding a group velocity for the fraction of the optical signal to travel through thereof with a time delay equal to the length dividing the group velocity. At least one tap-output path of the multi-stage series of the optical equalizer based on the optical FIR filter is selected to be a wider waveguide so that a normal width waveguide can be made shorter for yielding a same time delay.

Figure 6B:
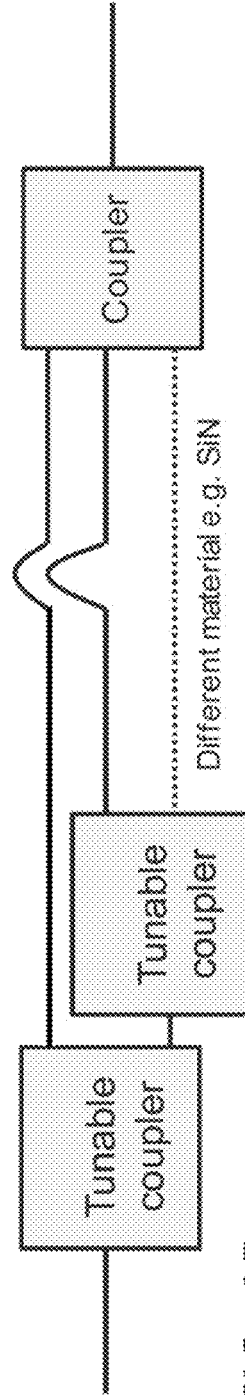

In another embodiment, as shown in FIG. 6B, each of these passive waveguides is characterized by a planar material, a length, and a width yielding a group velocity for the fraction of the optical signal to travel through thereof with a time delay equal to the length dividing the group velocity. At least one tap-output path of the multi-stage series of the optical equalizer based on the optical FIR filter is selected to be waveguide having a different planar material to yield a different time delay. As an example in silicon photonics, Si and SiN can be used where group index of Si waveguide is around 2.2 times higher than SiN waveguide. Using SiN material to replace Si material for the waveguide can make it shorter for yielding a same time delay.

Figure 6C:
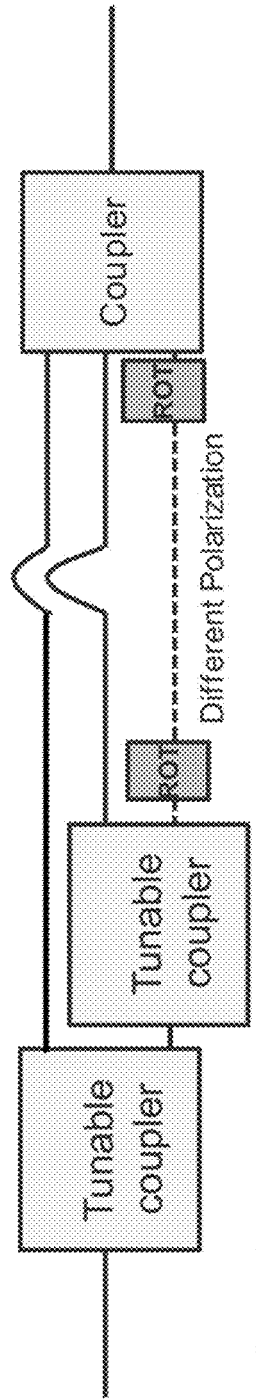

In yet another embodiment, as shown in FIG. 6C, at least one tap-output path in the multi-stage series of the optical equalizer can be selected to be a waveguide containing a pair of polarization rotators to create a polarization mode of the fraction of the optical signal to be different from that of another fraction of the optical signal in another waveguide or waveguides. Different polarization mode results in different phase delay due to a different time delay caused by different group velocity. As TE polarization mode has a higher group index than TM polarization mode in a same waveguide material (e.g., Si waveguide), TM mode can be used in the fast line waveguide and TE polarization mode can be used in the slow line waveguide. In general, any two polarizations with different group indices can be used for slow and fast lines to make the line difference smaller.

Figure 7:
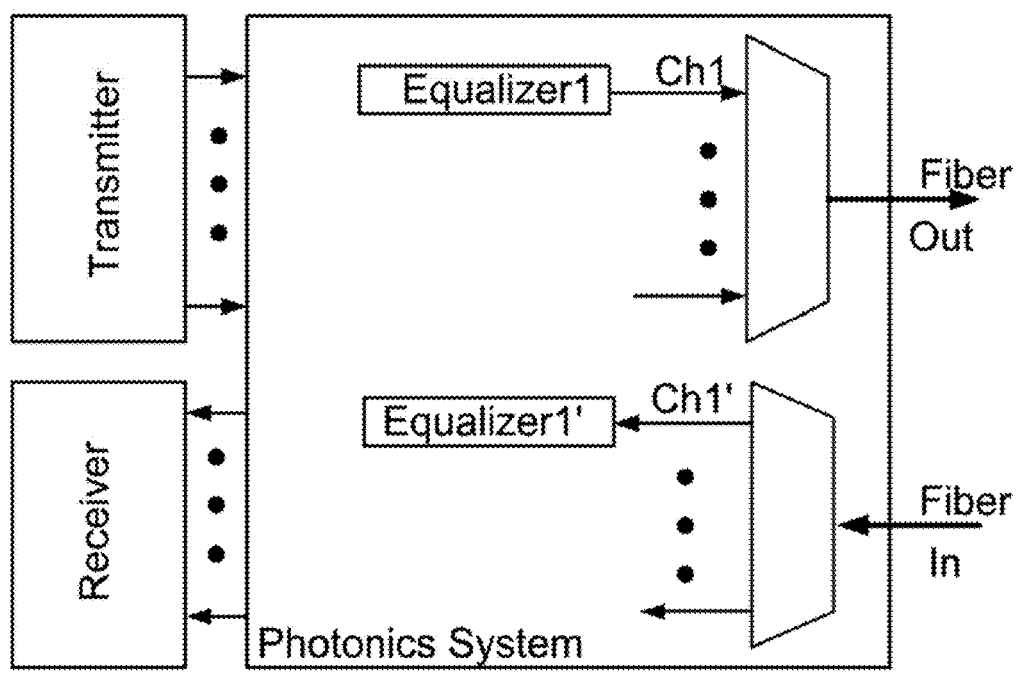
FIG. 7 is a schematic diagram of a photonics system including an optical equalizer per optical channel according to an alternative embodiment of the present disclosure.

In another aspect, the present disclosure provides a photonics system having the optical equalizer disposed in each optical channel before the receiver or at a transmitter in the electro-optical communication network. FIG. 7 is a schematic diagram of a photonics system including an optical equalizer per optical channel according to an alternative embodiment of the present disclosure. The photonics system shown in FIG. 7 can be part of transceiver system. As a part of transmission system, the photonics system receives multiple optical signals from the transmitter. The multiple optical signals in multiple optical channels are combined by a Mux device before outputting a DWDM signal to an optical fiber. Each channel signal may be a light pulse modulated by a modulator (not shown in the figure). In any one optical channel, an optical equalizer, e.g., Equalizer1, can be installed there for providing necessary amplitude and phase adjustment. Each of these optical equalizers can be implemented using the FIR-filter-based optical equalizer provided in this disclosure. Alternatively, the photonics system receives multiple channel signals demuxed by a Demux device from the multiplexed optical signal inputted from an optical fiber (right side). Each channel signal may be a light pulse modulated by a modulator (not shown in the figure) at the transmitter side at far end of the communication network. The bandwidth limitations of the modulator and fiber-induced chromatic dispersion and polarization mode dispersion generate different kinds of inter-symbol interference (ISI) in the multiple channel signals. The optical equalizer (e.g., Equalizer1') disposed in each channel (e.g., Ch1') is substantially one of optical FIR-filter-based optical equalizer provided in the present disclosure to overcome the ISI for each channel. As each optical equalizer can be directly integrated into the photonics system, the equalization of the multi-channel signals can be achieved fully in optical domain before they are detected by detectors of the receiver. Equalization in optical domain is advantageous over electrical domain as phase information of each channel is available in the optical domain.

Optionally, different embodiments as shown in FIG. 1 through FIG. 5 of the optical equalizer based on the optical FIR filter in different configurations can be implemented and integrated in the photonics system. These FIR-based optical equalizers can be used to overcome different sources of ISI. Some configurations of the optical equalizer can be made non-adaptive for predictable ISI to save power and ease the design procedure of the couplers in the equalizer. Some configurations of the optical equalizer can be made adaptive for adjusting amplitude and phase of each channel signal. Some configurations of the optical equalizer can be made as a-thermal one to be temperature independent, desired for many photonics communication applications. Optionally, in some configurations of the optical equalizer, delay line of the FIR filter can be made shorter to save area and decrease propagation loss. Optionally, the FIR-filter-based optical equalizer can be configured to be adaptive for tuning amplitude or power ratio of the optical signal using tunable coupler or VOA as well as tuning phase using thermal heater, making the optical equalizer very suitable for various field applications of the photonics system in the different kinds of communication networks.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical equalizer comprising:
   an input port;
   an output port;
   a filter having a number of stages coupled to each other in a multi-stage series with an output terminal of any stage being coupled to an input terminal of an adjacent next stage while the input terminal of a first stage of the multi-stage series being coupled from the input port configured to receive an optical signal, each stage including a tap terminal configured to pass a fraction of the optical signal factored by a coefficient of multiplication to a tap-output path of the corresponding stage characterized by a corresponding phase delay;
   a combiner configured to sum up respective fractions of the optical signal from the number of tap-output paths of the multi-stage series to the output port; and
   a thermal heater disposed to the tap-output path for tuning the corresponding phase delay of the corresponding fraction of the optical signal thereof,
   wherein the filter comprises a directional tap coupler per stage, wherein at least a first stage of the multi-stage series is an asymmetric directional tap coupler.

2. The optical equalizer of claim 1, wherein the coefficient of multiplication associated with the directional tap coupler at one of the multi-stage series comprises a non-adaptive coefficient of multiplication for amplitude adjustment of the fraction of the optical signal through the tap-output path of the corresponding stage.

3. The optical equalizer of claim 1, wherein at least one stage of the filter comprises a 3 dB coupler series.

4. The optical equalizer of claim 1, wherein the filter comprises a multi-mode interference (MMI) coupler per stage, wherein at least a first MMI coupler at the first stage of the multi-stage series is an asymmetric MMI coupler.

5. The optical equalizer of claim 1, wherein the filter comprises a tunable coupler based on Mach-Zehnder interferometer (MZI) for dynamic adjusting a power ratio of the fraction of the optical signal in each corresponding tap-output path.

6. The optical equalizer of claim 5, wherein the tunable coupler based on Mach-Zehnder interferometer comprises one input 3 dB 1×2 coupler coupled to two arms and then coupled to one output 3 dB 2×2 coupler, the two arms being characterized by the tunable phase delay of one arm relative to another arm between the input 3 dB 1×2 coupler and the output 3 dB 2×2 coupler.

7. The optical equalizer of claim 6, wherein each of the two arms of the tunable filter comprises a waveguide made by a combination of at least a first material and a second material, the tunable phase delay being contributed by at least a first length difference of the first material between the two arms and a second length difference of the second material between the two arms.

8. The optical equalizer of claim 7, wherein the first material is silicon and the second material is silicon nitride.

9. The optical equalizer of claim 7, wherein the tunable coupler is configured to be a-thermal by setting a first value of a temperature derivative of refraction index of the first material multiplied by the first length difference to be equal to a second value of a temperature derivative of refraction index of the second material multiplied by the second length difference.

10. The optical equalizer of claim 6, wherein each of the two arms of the tunable filter comprises a waveguide made by a same material while at least one of the two arms includes two polarization rotators configured to convert a transverse magnetic (TM) polarization mode to a transverse electric (TE) polarization mode or vice versa, the tunable phase delay being contributed by at least a first optical length difference of TM mode between the two arms and a second optical length difference of TE mode between the two arms.

11. The optical equalizer of claim 10, wherein the same material is silicon.

12. The optical equalizer of claim 10, wherein the tunable coupler is configured to be a-thermal by setting a first value of a temperature derivative of refraction index for TM mode multiplied by the first optical length difference to be equal to a second value of a temperature derivative of refraction index for TE mode multiplied by the second optical length difference.

13. The optical equalizer of claim 1, wherein each tap-output path per stage comprises a waveguide characterized by a planar material, a length, and a width yielding a group velocity for the fraction of the optical signal to travel through thereof with a time delay equal to the length dividing the group velocity, at least one tap-output path comprising a waveguide having a different planar material to yield a different time delay from each other tap-output path in the multi-stage series.

14. The optical equalizer of claim 1, wherein each tap-output path per stage comprises a waveguide characterized by a planar material, a length, and a width yielding a group velocity for the fraction of the optical signal to travel through thereof with a time delay equal to the length dividing the group velocity, at least one tap-output path comprising a waveguide having a wider width to yield a different time delay from each other tap-output path in the multi-stage series.

15. An optical equalizer comprising:
an input port;
an output port;
a filter having a number of stages coupled to each other in a multi-stage series with an output terminal of any stage being coupled to an input terminal of an adjacent next stage while the input terminal of a first stage of the multi-stage series being coupled from the input port configured to receive an optical signal, each stage including a tap terminal configured to pass a fraction of the optical signal factored by a coefficient of multiplication to a tap-output path of the corresponding stage characterized by a corresponding phase delay;
a combiner configured to sum up respective fractions of the optical signal from the number of tap-output paths of the multi-stage series to the output port,
wherein at least one tap-output path in the multi-stage series comprises a waveguide including a pair of polarization rotators to create a polarization mode of the fraction of the optical signal to be different from that of another fraction of the optical signal in another waveguide of a different tap-output path in a different stage of the multi-stage series, resulting in a phase delay due to a time delay between the at least one tap-output path and another tap-output path.

16. The optical equalizer of claim 1, wherein the filter comprises a combination of one or more directional tap couplers, one or more MMI couplers, and one or more 3 dB couplers to make each tap-output path associated with a non-adaptive coefficient of multiplication while using the thermal heater to adjust phase thereof.

17. The optical equalizer of claim 1, further comprising a variable optical attenuator (VOA) in at least one of the number of tap-output paths to make the corresponding tap-output path to be associated with an adaptive coefficient of multiplication for dynamically adjusting amplitude of the fraction of the optical power through the corresponding tap-output path while using a thermal heater or a tunable filter based on Mach-Zehnder interferometer (MZI) to adjust phase thereof.

18. A photonics system used in electro-optical communication network comprising an optical equalizer per optical channel before a receiver, the optical equalizer comprising:
an input port;
an output port;
a filter having a number of stages coupled to each other in a multi-stage series with an output terminal of any stage being coupled to an input terminal of an adjacent next stage while the input terminal of a first stage of the multi-stage series being coupled from the input port configured to receive an optical signal from the optical channel, each stage including a tap terminal configured to pass a fraction of the optical signal factored by a coefficient of multiplication to a tap-output path of the corresponding stage characterized by a corresponding phase delay; and
a combiner configured to sum up respective fractions of optical signal from the number of tap-output paths of the multi-stage series to the output port,
wherein the optical equalizer further comprises a thermal heater disposed in each tap-output path, the filter comprises a combination of one or more directional tap couplers, one or more MMI couplers, and one or more 3 dB couplers to make each tap-output path to be associated with a non-adaptive coefficient of multiplication while using the thermal heater to adjust phase thereof.

19. The photonics system of claim 18, wherein the optical equalizer further comprises a variable optical attenuator (VOA) in at least one of the number of tap-output paths to make the corresponding tap-output path to be associated with an adaptive coefficient of multiplication for dynamically adjusting amplitude of the fraction of the optical power through the corresponding tap-output path while using a thermal heater to adjust phase and a tunable coupler based on Mach-Zehnder interferometer (MZI) to adjust power ratio thereof.

20. The photonics system of claim 18, wherein the optical equalizer is integrated in a planar silicon substrate.

21. The photonics system of claim 18, wherein the optical channel is coupled to an optical fiber.

\* \* \* \* \*